United States Patent [19]

Ferrari

[11] Patent Number: 5,348,397
[45] Date of Patent: Sep. 20, 1994

[54] MEDICAL TEMPERATURE SENSING PROBE

[76] Inventor: R. Keith Ferrari, 6525 Radcliff Dr., Nashville, Tenn. 37221

[21] Appl. No.: 38,291

[22] Filed: Mar. 29, 1993

[51] Int. Cl.$^5$ .............. G01K 7/22; H01B 5/08; H01B 1/04; H01B 7/00; H01B 7/20
[52] U.S. Cl. .................. 374/185; 174/119 C; 174/126.2
[58] Field of Search ................ 374/183, 185; 174/119 C, 126.2, 128.1, 128.2

[56] References Cited

U.S. PATENT DOCUMENTS

| | | |
|---|---|---|
| 3,677,705 | 7/1972 | Ramm et al. |
| 3,733,213 | 5/1973 | Jacob |
| 4,132,828 | 1/1979 | Nakamura et al. |
| 4,421,582 | 12/1983 | Horsma et al. ............ 174/DIG. 8 |
| 4,518,632 | 5/1985 | Jones ........................ 174/128.2 |
| 4,661,403 | 4/1987 | Morin |
| 4,745,519 | 5/1988 | Breidegam ................. 361/220 |
| 4,762,603 | 8/1988 | Morin ........................ 174/74 R |
| 4,990,490 | 2/1991 | Pathare et al. ............. 174/125.1 |
| 5,131,105 | 7/1992 | Harrawood et al. ............ 5/607 |
| 5,137,475 | 8/1992 | Olms ........................... 439/725 |

FOREIGN PATENT DOCUMENTS

| | | | |
|---|---|---|---|
| 2643210 | 4/1978 | Fed. Rep. of Germany ... | 174/126.2 |
| 0036274 | 9/1977 | Japan .......................... | 174/126.2 |
| 0010523 | 2/1982 | Japan .......................... | 174/126.2 |
| 0189811 | 7/1990 | Japan .......................... | 174/128.1 |
| 0071509 | 3/1991 | Japan .......................... | 174/128.1 |
| 0129606 | 6/1991 | Japan .......................... | 174/128.1 |

Primary Examiner—William A. Cuchlinski, Jr.
Assistant Examiner—Diego F. F. Gutierrez
Attorney, Agent, or Firm—Vernon J. Pillote

[57] ABSTRACT

A medical temperature sensing probe including a temperature responsive device having electric contacts and insulated electric conductors having one end electrically connected to a respective one of the electric contacts. Each conductor comprises a carbon-fiber tow having low thermal conductivity and plated with an electrically conductive metal. The metal plated tows are X-ray translucent and have low thermal conductivity to minimize thermal conduction of heat to or from the temperature responsive device.

11 Claims, 1 Drawing Sheet

MEDICAL TEMPERATURE SENSING PROBE

BACKGROUND OF THE INVENTION

It is frequently necessary in the care and treatment of some patients to monitor body temperature for extended periods of time and, in the case of neonatal and premature infants, to also control external environmental temperature, for example by infrared heating, in order to maintain a desired body temperature. The sensing element of the temperature probe is mounted directly on the patient's body with a probe cover that adhesively secures the sensing element to the body and also thermally insulates the sensing element from the external environmental temperature so that the temperature sensing element and the temperature monitor and/or temperature controller controlled thereby, can properly respond to the temperature of the patient's body.

Medical temperature monitoring and controlling devices are generally adapted to use replaceable temperature sensing probes provided the probes have a preselected temperature-resistance characteristic compatible with the monitor design. Medical temperature sensing probes in general comprises a thermistor temperature sensing element having electric contacts and lead conductors connected to contacts. Medical temperature monitoring devices made by different manufacturers and for different uses are frequently designed for use with temperature probes having different temperature-resistance curves. For example, four single-thermistor type medical temperature sensing probes in common use for neonatal care have measured resistances at 25 degrees Centigrade of about 2,050 ohms; 2,252 ohms; 6,867 ohms and 10,000 ohms and there is also a dual thermistor probe with three wires having a dual resistance of 6,000 and 30,000 ohms at 25 degrees Centigrade. The temperature-resistance characteristics of the thermistor are dependent on the resistivity of the thermistor element, the thickness of the element between the contacts, and the area of the contacts. The resistance of the thermistor is adjustable during manufacture of the thermistors by removing some of the surface area of the electric contacts to produce a probe having a preselected resistance at a selected temperature such as 25 degrees C.

Prior temperature sensing probes have used metal wire conductors to connect the temperature sensing elements to the temperature monitor and controller device. However, metal wires create distinct lines and shadows within X-rays that are taken of the patient and such picture obstructions cause concern and aggravation to the radiologist and increase the possibility of misinterpretation of the X-ray. Further, metal wires generally have high thermal conductivity and if portions of the metal wires proximate to the temperature sensing element are exposed to ambient conditions which either heat or cool the wire, the metal wire can conduct heat to or away from the temperature sensing element and produce an inaccurate body temperature reading. Prior efforts to overcome this problem included use of temperature probe covers large enough to also cover and hold a portion of the lead wires adjacent the sensing element against the patient's body to not only shield the wire from ambient conditions but also warm or cool the wire to the patient's body temperature.

SUMMARY OF THE INVENTION

It is an object of the present invention to overcome the problems of the prior medical temperature sensing probes by providing a temperature sensing probe in which the conductors attached to the temperature sensing element are at least X-ray translucent at low X-ray levels used in neonatals and X-ray transparent at higher X-ray levels in adults.

Another object of the this invention is to provide a medical temperature sensing probe in which the lead conductors attached to the temperature sensing element have low thermal conductivity to minimize heating or cooling of the temperature sensing element due to exposure of the lead conductors to ambient conditions which either heat or cool the wires.

Accordingly, the present invention provides a medical temperature sensing probe including a thermistor temperature sensing element having electric contacts and insulated electric conductors connected to a respective one of the electric contacts, and in which the electric conductors each comprise a carbon fiber tow plated with an electrically conductive metal and preferably a multi-filamentary polyacronitrile (pan) based carbon fiber tow plated with an electrically conductive metal. As used herein, the phrase "tow" is intended to include untwisted and twisted carbon-fiber tows and yarns.

Pan based carbon-fiber tows are X-ray transparent as compared to metal wires of comparable size. However, pan based carbon-fiber tows exhibit anisotropic electric conductivity and are difficult to electrically connect to other devices. Further, such carbon-fiber tows have longitudinal electrical resistance that is hundreds of times higher than metal wires of comparable size.

Metal plating the carbon-fiber tows effectively overcomes the problem of anisotropic conductivity of the carbon-fibers and enables the carbon-fiber tows to be attached to contacts on the temperature sensing element by conventional techniques such as soldering. The metal plating on carbon-fiber tows also markedly improves the longitudinal electrical conductivity of the tows and enables production of medical temperature sensing probes having preselected temperature-resistance characteristics required for use with different medical temperature monitoring and controlling devices. Although even very small metal wire conductors such as 28 to 30 AWG produce lines and shadows on X-rays, the metal plating on the pan based carbon-fiber tow is very thin and metal plated carbon-fiber tows suitable for temperature sensing probes are X-ray transparent under radiation levels used for adults and substantially X-ray transparent even at the very low radiation levels used in X-rays of neonatal and premature infants.

Pan based carbon-fiber tows have a much lower thermal conductivity than metal wires of comparable size. The low thermal conductivity of the metal plated carbon-fiber lead conductors minimizes conduction of heat to or from the temperature sensing element so that the temperature probe can more accurately respond to the true body temperature.

DETAILED DESCRIPTION

Figure 1:
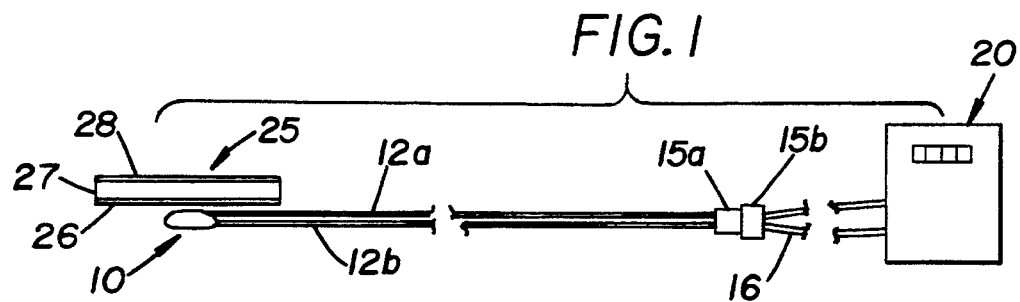
FIG. 1 is an exploded schematic view of a temperature probe and probe cover and illustrating connection of the probe to a temperature monitoring and control device.
Figure 3:
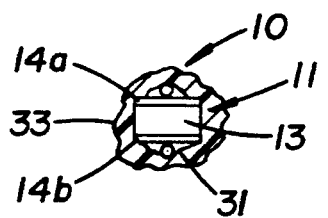
FIG. 3 is a transverse sectional view taken on the plane 3—3 of FIG. 2.
Figure 2:
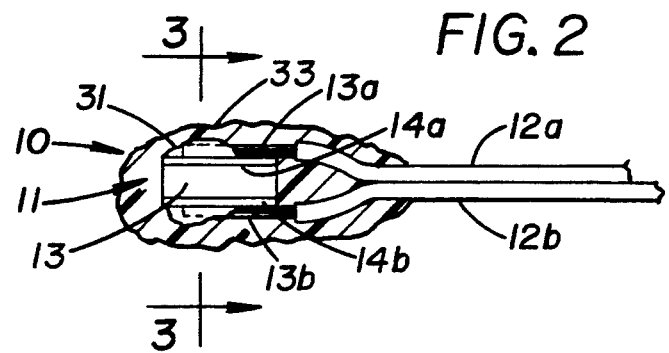
FIG. 2 is a sectional view through a temperature probe having a thermistor sensing element and metal plated carbon-fiber leads in accordance with the present invention.
Figure 4:
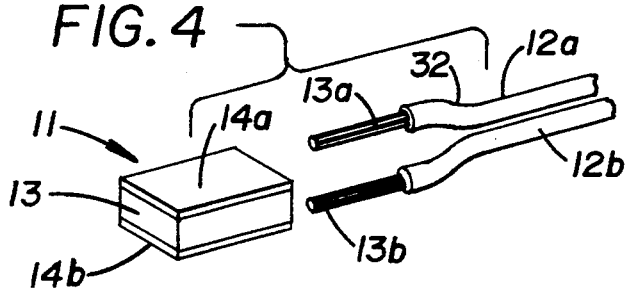
FIG. 4 is an exploded perspective view of a thermistor and lead conductors.
Figure 5:
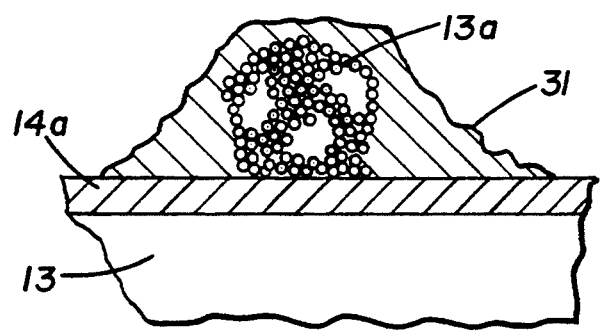
FIG. 5 is a transverse sectional view through a metallized carbon fiber tow illustrating the same on an enlarged scale.

The temperature sensing probe in general includes a temperature probe tip 10 containing a temperature sensing element 11, and insulated electric conductors 12a, 12b that are electrically connected to the temperature sensing element and have a length sufficient to at least extend from the temperature sensing element to a location outside of the chest area of the patient. The conductors 12a, 12b preferably have a length of about one-half meter and terminate in an electric connector fitting 15a that is adapted to interfit with a connector fitting 15b of an adapter cable 16. Different makes of medical temperature monitoring and controlling apparatus indicated at 20 in FIG. 1 may be designed to receive different types of plugs or jacks and the distal end of the adapter cable can be fitted with suitable plugs or jacks. The temperature sensing element 11 and adjacent portions of the conductors 12a, 12b are mounted on the body of a patient by a temperature probe cover 25. As is conventional, the temperature probe cover has a layer of skin compatible adhesive 26 at its underside, a layer of thermal insulation 27 such as foamed plastic, and a layer 28 of radiation reflective material such as metallized plastic.

The temperature sensing device 11 preferably comprises a body 13 of negative temperature coefficient semiconductor material having thermistor contacts 14a, 14b. In the wafer type thermistor illustrated, where the contacts 14a and 14b are disposed at opposite sides of the semi-conductor material 13, the resistance of the thermistor increases when the overlapping area of the contacts decreases. In the manufacture of thermistors, it is the practice to trim, that is cut or grind away one or both of the contacts until resistance of the thermistor at a selected temperature such as 25 degrees C. corresponds to the resistance at that temperature in a standardized temperature-resistance curve for thermistors having the same resistivity and thickness. Such thermistors are commercially available from Alpha Thermistor, Incorporated, San Diego, Calif. and Thermometrics, Inc., Edison, N.J.

In accordance with the present invention, the conductors 13a, 13b each comprise a multi-filamentary carbon-fiber tow plated with an electrically conductive metal. Standard carbon-fiber tows are made from a polyacrylonitrile precursor and are referred to as pan based carbon-fiber and are commercially available from Amoco Performance Products, Inc., Atlanta, Ga. In general the carbon-fiber tows are made by procedures described in U.S. Pat. No. 3,677,705 by heating polymeric fiber, e. g., acrylonitrile polymers or copolymers, in two stages, one to remove volatiles and carbonize and another to convert amorphous carbon into crystalline carbon. During such procedure, the carbon changes from amorphous to single crystal and then orients into fibrils. The fibrils have a fiber diameter in the range of about 5 to 8 microns and the number of fibers in a tow can vary in a wide range from a few hundred to many thousand. The carbon fiber tows can be metal plated or coated by vacuum deposition for example as disclosed in U.S. Pat. No. 4,132,828; by electroless deposition for example as disclosed in U.S. Pat. No. 3,733,213; by electroplating such as disclosed in U.S. Pat. No. 4,661,403; or by chemical vapor deposition, such as by thermal decomposition of nickel carbonyl gas. The tows are preferably metal plated to coat the fibers generally uniformly throughout the tow.

In general, unplated pan based carbon-fiber tows have a low density and are X-ray transparent as compared to metal wires of comparable size. Pan based carbon-fiber tows have longitudinal electrical resistance that is very high and longitudinal thermal conductivity that is very low as compared to metal wires of comparable size. Carbon-fiber tows also exhibit anisotropic electrical conductivity which presents a problem when making electrical connections to other devices.

The carbon-fiber tows are coated with an electrically conductive metal coating that is between 20% to 40% by weight of the metal plated carbon fiber tow and preferably greater than 25% for good solderability and less than 30% by weight of the plated tow for X-ray transparency. Since the density of the carbon-fiber tows is very low as compared to the density of the metal, the metal coating on the tow is very thin. The metal coating is preferably nickel which provides good solderability and electrical conductivity at moderate cost, but silver or gold could be used alone or in combination with the nickel coating. The pan based carbon fiber tows in the conductors 13a and 13b are desirably small size tows having less than 2000 fibers and preferably in the range of about 800 to 1200 fibers. For example, a 1000 fiber pan based carbon-fiber tow has a density of about 1.75 mg/cm$^3$ and nickel has a density of about 7.9 g/cm$^3$. A coating of 30% by weight of the nickel plated 1K carbon-fiber tow provides a metal coating on the fiber of about 0.5 microns in thickness. A 1K pan based carbon-fiber tow having a nickel plating about 30% by weight of the metal plated carbon fiber tow has been found to be X-ray transparent under normal X-ray levels used for adults and X-ray translucent or substantially X-ray transparent under the low X-ray levels used for neonatals and infants. The nickel coated carbon-fiber lead conductors are solderable on the thermistor contacts with low temperature solders indicated at 31, for example solders having melting points of 100 to 105 degrees C., and the metal coating markedly reduces electrical resistance of the carbon-fiber wires from about 450 ohms/meter for uncoated to about 50 ohms/meter for the metal coated. A one thousand fiber uncoated pan based carbon-fiber tow has a low axial thermal conductivity in a range of about 5 watts/meter/degree C. and the thin metal coating on the carbon fibers increases the axial thermal conductivity only moderately to about 7 watts/meter/degree C. However, the thermal conductivity of the metal coated carbon fiber tow is still very low as compared to copper wire of similar size. The low thermal conductivity of the metal coated carbon tows substantially prevents thermal conduction of heat by the conductors to or from the thermistor so that the thermistor can more accurately respond to the patient's body temperature. With the metal coated carbon-fiber lead conductors it is not necessary to insulate the lead conductors in the vicinity of the thermistor from ambient conditions which may either heat or cool the wires. Thus, small temperature probe covers can be used to cover the temperature sensing device, and it is not necessary to coil a portion of the lead conductors under the temperature probe cover to thermally insulate the lead conductors.

The metal plated carbon-fiber tows are covered with a layer of electric insulating material such as lead free PVC indicated at 32 and the insulation is stripped from the ends before soldering. The thermistor is preferably adjusted, as by removing a portion of one or both contacts 14a, 14b, after the carbon-fiber leads are attached to the thermistor, until the resistance of the temperature probe including the thermistor and the metal plated carbon-fiber leads at normal body temperature; namely 37 degrees C., is the same as the resistance at that point on the appropriate temperature resistance curve for the thermistor. The thermistor and end portions of the leads are thereafter covered as by a cap or coating of an electrically insulative and thermally conductive material such as epoxy or other plastic as indicated at 33.

The embodiments of the invention in which an exclusive property or privilege is claimed are defined as follows:

1. A medical temperature sensing probe including a temperature responsive device having electric contacts and insulated electric conductors having one end electrically connected to a respective one of the electric contacts, the improvement wherein each conductor comprises a carbon-fiber tow having low thermal conductivity and less than two thousand fibers and plated with an electrically conductive metal in an amount such that the metal plated tow is at least X-ray translucent, the metal plating being 20% to 40% by weight of the metal plated carbon fiber tow.

2. A temperature sensing probe according to claim 1 wherein each carbon fiber tow has about 800 to 1200 fibers.

3. A temperature probe according to claim 2 wherein the metal plating is about 25% to 30% by weight of the metal plated carbon-fiber tow.

4. A temperature sensing probe according to claim 1 wherein the metal is selected from the group comprising nickel, silver, gold, or a combination of any of the foregoing.

5. A temperature sensing probe according to claim 1 wherein the metal is nickel.

6. A temperature sensing probe according to claim 1 wherein the metal plated carbon fiber tows each have one end soldered to a respective one of the electric contacts on the temperature responsive device.

7. A temperature probe according to claim 1 wherein the conductors have a length of about one-half meter.

8. A medical temperature sensing probe including a thermistor having electric contacts and insulated electric conductors having one end electrically connected to a respective one of the electric contacts, the improvement wherein each conductor comprises a pan based carbon-fiber tow having about 800 to 1200 fibers and plated with an electrically conductive metal in an amount such that the metal plated tow is at least X-ray translucent, the metal plating being 20% to 40% by weight of the metal plated carbon-fiber tow.

9. A temperature sensing probe according to claim 8 wherein the metal is nickel.

10. A temperature probe according to claim 8 wherein the metal plating is about 25% to 30% by weight of the metal plated carbon-fiber tow.

11. A temperature probe according to claim 8 wherein the conductors have a length of about one-half meter.

* * * * *